US008886107B2

(12) United States Patent
Tamura (10) Patent No.: US 8,886,107 B2
(45) Date of Patent: Nov. 11, 2014

(54) IMAGE PROCESSING APPARATUS, IMAGE PROCESSING METHOD, AND COMPUTER-READABLE MEDIUM

(75) Inventor: Hirokazu Tamura, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 15 days.

(21) Appl. No.: 13/698,466

(22) PCT Filed: Sep. 6, 2012

(86) PCT No.: PCT/JP2012/073393
§ 371 (c)(1),
(2), (4) Date: Nov. 16, 2012

(87) PCT Pub. No.: WO2013/047214
PCT Pub. Date: Apr. 4, 2013

(65) Prior Publication Data
US 2013/0084113 A1    Apr. 4, 2013

(30) Foreign Application Priority Data
Sep. 30, 2011    (JP) ................................ 2011-218325

(51) Int. Cl.
G03G 13/20    (2006.01)
H04N 1/60    (2006.01)
G03G 15/20    (2006.01)

(52) U.S. Cl.
CPC ............. G03G 13/20 (2013.01); H04N 1/6022 (2013.01); G03G 15/2039 (2013.01)
USPC ............................................ 399/335; 399/69

(58) Field of Classification Search
CPC combination set(s) only.
See application file for complete search history.

(56) References Cited

U.S. PATENT DOCUMENTS

| 6,393,229 B1 | 5/2002 | Toyohara |
| 2009/0010670 A1 | 1/2009 | Otsuka et al. |

FOREIGN PATENT DOCUMENTS

| JP | 2004-245895 A | 9/2004 | |
| JP | 2010-145907 A | 7/2010 | |
| JP | 2010145907 A * | 7/2010 | ............. G03G 15/20 |

OTHER PUBLICATIONS

Notification of Transmittal of the International Search Report and the Written Opinion of the International Searching Authority, or the Declaration (PCT/IDS/220), International Search Report (PCT/ISA/210), and Written Opinion of the International Searching Authority (PCT/ISA/237) mailed Apr. 22, 2013, in counterpart International Application No. PCT/JP2012/073393.

* cited by examiner

*Primary Examiner* — Clayton E Laballe
*Assistant Examiner* — Jas Sanghera
(74) *Attorney, Agent, or Firm* — Fitzpatrick, Cella, Harper & Scinto

(57) ABSTRACT

An image processing apparatus includes a mode determination unit for determining a print mode, a fixing temperature acquisition unit for acquiring fixing temperature information corresponding to the print mode determined by the mode determination unit, an image adjustment means for, after the fixing temperature information is acquired by the fixing temperature acquisition unit, accepting an instruction of an adjustment value for image data and performing image adjustment corresponding to the adjustment value for the image data, and a control unit for controlling a fixing temperature of a fixing device in accordance with the fixing temperature information acquired by the fixing temperature acquisition unit before and after the image adjustment is performed by the image adjustment unit.

12 Claims, 8 Drawing Sheets

IMAGE PROCESSING APPARATUS, IMAGE PROCESSING METHOD, AND COMPUTER-READABLE MEDIUM

TECHNICAL FIELD

The present invention relates to an image processing apparatus for adjusting the temperature of a fixing device when thermally fixing a toner image formed by electrophotography on a printing paper sheet, an image processing method, and a computer-readable medium.

BACKGROUND ART

In an image forming apparatus for thermally fixing a toner image formed by electrophotography on a printing paper sheet, the fixing temperature of the fixing device is decided in accordance with the color material amount per unit area to be placed on the printing paper sheet. Normally, the maximum value of the color material amount per unit area is predetermined, and the temperature is adjusted to obtain a fixing temperature capable of properly fixing an image having the maximum value.

In a full-color copying machine, since image formation is done by superimposing a plurality of color materials such as CMYK color materials (cyan, magenta, yellow, and black, respectively), the color material amount (to be referred to as a toner amount hereinafter) to be placed on a printing paper sheet tends to be large. For this reason, the required heat capacity of a fixing roller increases. If the temperature of the fixing device is lower than a predetermined set temperature after powering on the machine, after being in the sleep mode, or the like, the warm-up time up to the predetermined set temperature is long. As a result, a waiting time to the start of printing occurs. In addition, an image may be output in a toner amount much smaller than the assumed maximum amount. For example, in a mode using only the K color material, heating is excessive, and the power is wasted.

To suppress the above-described power consumption, in Japanese Patent Laid-Open No. 2004-245895, when draft printing is selected, image data undergoes thinning. A temperature lower than that in any mode other than the draft printing is determined to be the fixing temperature in accordance with the image data thinning ratio.

An image forming apparatus has an image adjustment function represented by a density adjustment function. For example, if a printed product seems to be light-colored, the set value of density is changed to be larger by the image adjustment function, and reprinting is performed.

In the above-described arrangement, the toner consumption increases when the set value is changed to a high density. The fixing temperature changes to a high temperature when the toner consumption increases. As the result of the change in the fixing temperature, the image appearance, including the tonality and gloss characteristic, changes before and after the image adjustment. The gloss characteristic changes due to a change in the printed surface properties caused by toner fusibility conversion. If such a change in the tonality and gloss characteristic occurs during an adjustment value search while getting feedback from the printed product, the optimum adjustment value is difficult to acquire.

SUMMARY OF INVENTION

The present invention adjusts the temperature of a fixing device not to change the fixing characteristic of the fixing device before and after image adjustment.

According to one aspect of the present invention, there is provided an image processing apparatus characterized by comprising: mode determination means for determining a print mode; fixing temperature acquisition means for acquiring fixing temperature information corresponding to the print mode determined by the mode determination means; image adjustment means for, after the fixing temperature information is acquired by the fixing temperature acquisition means, accepting an instruction of an adjustment value for image data and performing image adjustment corresponding to the adjustment value for the image data; and control means for controlling a fixing temperature of a fixing device in accordance with the fixing temperature information acquired by the fixing temperature acquisition means before and after the image adjustment is performed by the image adjustment means.

According to another aspect of the present invention, there is provided an image processing apparatus characterized by comprising: toner amount acquisition means for acquiring a maximum value of a toner amount of a pixel included in image data; fixing temperature calculation means for calculating a value of a fixing temperature corresponding to the maximum value of the toner amount acquired by the toner amount acquisition means; image adjustment means for, after the value of the fixing temperature is calculated by the fixing temperature calculation means, accepting an instruction of an adjustment value for the image data and performing image adjustment corresponding to the adjustment value for the image data; and control means for controlling a fixing temperature of a fixing device in accordance with the value of the fixing temperature calculated by the fixing temperature calculation means before and after the image adjustment is performed by the image adjustment means.

According to another aspect of the present invention, there is provided an image processing method characterized by comprising: a mode determination step of determining a print mode; a fixing temperature acquisition step of acquiring fixing temperature information corresponding to the print mode determined in the mode determination step; an image adjustment step of, after the fixing temperature information is acquired in the fixing temperature acquisition step, accepting an instruction of an adjustment value for image data and performing image adjustment corresponding to the adjustment value for the image data; and a control step of controlling a fixing temperature of a fixing device in accordance with the fixing temperature information acquired in the fixing temperature acquisition step before and after the image adjustment is performed in the image adjustment step.

According to another aspect of the present invention, there is provided an image processing method characterized by comprising: a toner amount acquisition step of acquiring a maximum value of a toner amount of a pixel included in image data; a fixing temperature calculation step of calculating a value of a fixing temperature corresponding to the maximum value of the toner amount acquired in the toner amount acquisition step; an image adjustment step of, after the value of the fixing temperature is calculated in the fixing temperature calculation step, accepting an instruction of an adjustment value for the image data and performing image adjustment corresponding to the adjustment value for the image data; and a control step of controlling a fixing temperature of a fixing device in accordance with the value of the fixing temperature calculated in the fixing temperature calculation step before and after the image adjustment is performed in the image adjustment step.

According to another aspect of the present invention, there is provided a computer-readable medium storing a program that causes a computer to function as: mode determination means for determining a print mode; fixing temperature acquisition means for acquiring fixing temperature information corresponding to the print mode determined by the mode determination means; image adjustment means for, after the fixing temperature information is acquired by the fixing temperature acquisition means, accepting an instruction of an adjustment value for image data and performing image adjustment corresponding to the adjustment value for the image data; and control means for controlling a fixing temperature of a fixing device in accordance with the fixing temperature information acquired by the fixing temperature acquisition means before and after the image adjustment is performed by the image adjustment means.

According to another aspect of the present invention, there is provided a computer-readable medium storing a program that causes a computer to function as: toner amount acquisition means for acquiring a maximum value of a toner amount of a pixel included in image data; fixing temperature calculation means for calculating a value of a fixing temperature corresponding to the maximum value of the toner amount acquired by the toner amount acquisition means; image adjustment means for, after the value of the fixing temperature is calculated by the fixing temperature calculation means, accepting an instruction of an adjustment value for the image data and performing image adjustment corresponding to the adjustment value for the image data; and control means for controlling a fixing temperature of a fixing device in accordance with the value of the fixing temperature calculated by the fixing temperature calculation means before and after the image adjustment is performed by the image adjustment means.

According to another aspect of the present invention, there is provided an image processing apparatus characterized by comprising: mode determination means for determining a print mode; and control means for controlling a fixing temperature of a fixing device in accordance with fixing temperature information corresponding to the print mode determined by the mode determination means regardless of an adjustment value of a image adjustment processing for image data.

According to another aspect of the present invention, there is provided an image processing method characterized by comprising: a mode determination step of determining a print mode; and a control step of controlling a fixing temperature of a fixing device in accordance with fixing temperature information corresponding to the print mode determined in the mode determination step regardless of an adjustment value of a image adjustment processing for image data.

According to the present invention, it is possible to prevent the fixing characteristic of a fixing device from changing before and after image adjustment.

Further features of the present invention will become apparent from the following description of exemplary embodiments (with reference to the attached drawings).

DESCRIPTION OF EMBODIMENTS

The embodiments of the present invention will now be described with reference to the accompanying drawings.

First Embodiment

[Arrangement of Image Forming Apparatus]

Figure 1:
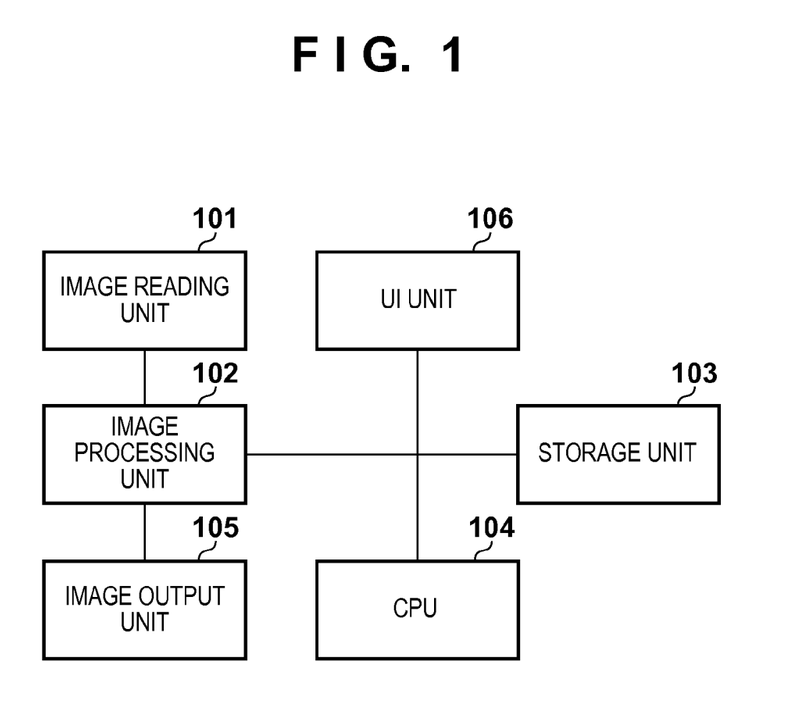
FIG. 1 is a block diagram showing an example of the schematic arrangement of an image forming apparatus.

FIG. 1 is a block diagram showing an example of the arrangement of an electrophotographic image forming apparatus according to the embodiment. As shown in FIG. 1, the image forming apparatus includes an image reading unit 101, an image processing unit 102, a storage unit 103, a CPU 104, and an image output unit 105. Note that the image forming apparatus according to this embodiment is connectable to an external apparatus, such as a server, for managing image data or a personal computer (PC) for instructing execution of printing via a network or the like. An apparatus including the image processing unit 102, the storage unit 103, and the CPU 104 will be defined as an image processing apparatus.

The image reading unit 101 reads the image of a document and outputs image data. The image processing unit 102 converts print information including image data input from the image reading unit 101 or an external apparatus into intermediate information (to be referred to as an "object" hereinafter), and stores it in the object buffer of the storage unit 103. The image processing unit 102 also generates bitmap data based on the buffered object, and stores it in the buffer of the storage unit 103. At this time, the image processing unit 102 performs color conversion processing, image adjustment processing, total toner amount control processing, and the like. Details will be described later.

The storage unit 103 is formed from a ROM (Read Only Memory), a RAM (Random Access Memory), a hard disk (HD), and the like. The ROM stores various kinds of control programs and image processing programs to be executed by the CPU 104. The RAM is used as a reference area or a working area where the CPU 104 stores data and various kinds of information. The RAM and the HD are used to, for example, buffer an object and store the set value of the fixing temperature to be described later. Image data are accumulated in the RAM or HD to sort the pages, or documents for a plurality of sorted pages are accumulated to print a plurality of copies. The image output unit 105 forms and outputs a color image to a printing medium, such as a printing paper sheet. A UI unit 106 accepts a user operation to designate the type of image processing, level adjustment, and the like by the image processing unit 102. For example, the user sets the adjustment amount of the above-described image adjustment processing.

[Outline of Apparatus]

Figure 2:
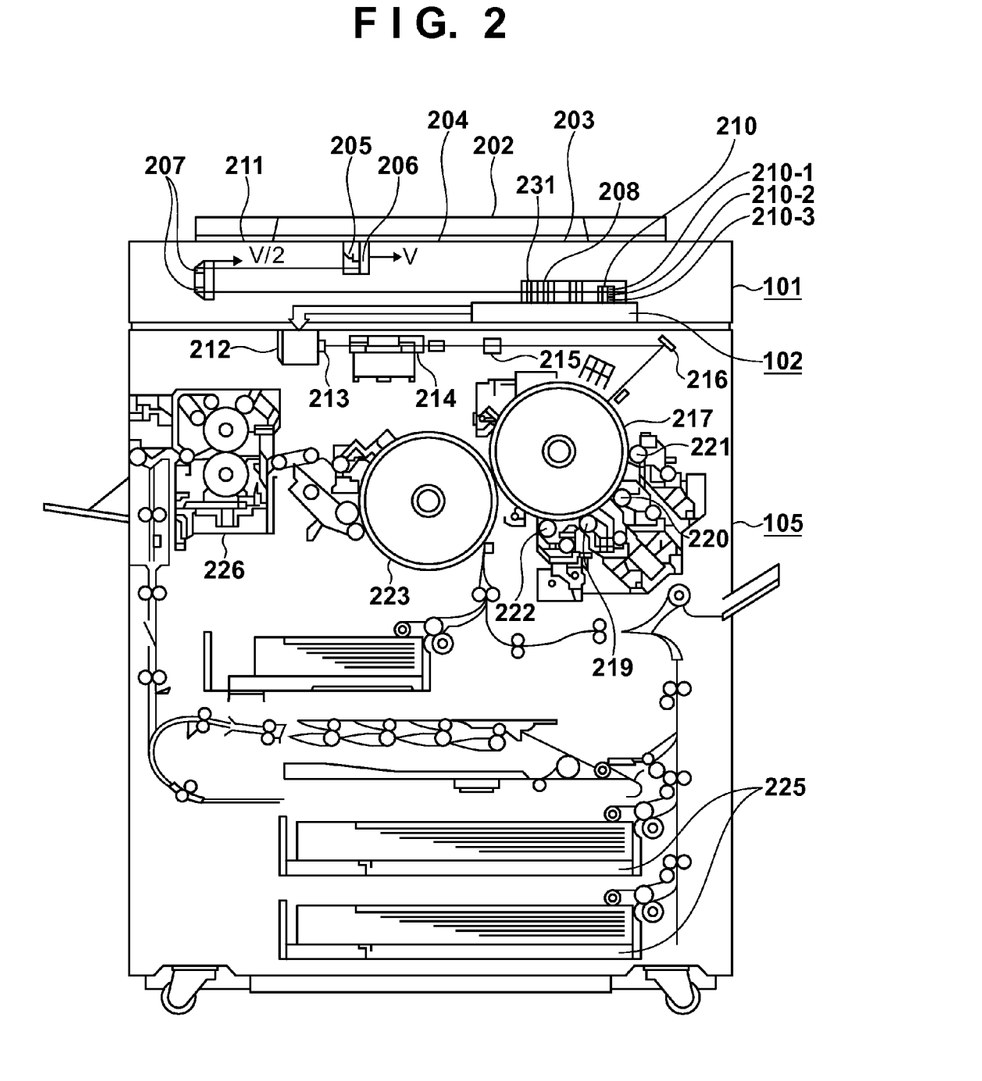
FIG. 2 is a sectional view showing the outline of the image forming apparatus.

FIG. 2 is a sectional view showing the outline of the image forming apparatus. In the image reading unit 101, a document 204 whose image is to be read is placed between a platen glass 203 and a press plate 202. The document 204 is irradiated with light from a lamp 205. The light reflected by the document 204 is guided to mirrors 206 and 207, and an image is formed on a 3-line sensor 210 via a lens 208. Note that an infrared cut filter 231 is provided on the lens 208. A motor (not shown) moves a mirror unit including the mirror 206 and the lamp 205 at a velocity V and a mirror unit including the mirror 207 at a velocity V/2 in the direction of arrows. That is, the mirror units move in a direction (sub-scanning direction) perpendicular to the electrical scanning direction (main scanning direction) of the 3-line sensor 210, thereby scanning the entire surface of the document 204.

The 3-line sensor 210 formed from three lines of CCDs separates the colors of the received light information, reads the color components of full-color information RGB (red, green, and blue), and sends the color component signals to the image processing unit 102. Note that in this embodiment, each CCD included in the 3-line sensor 210 has light-receiving elements corresponding to 5,000 pixels. The 3-line sensor 210 is assumed to be able to read an A3 document having the maximum size placeable on the platen glass 203 at a resolution of 600 dpi in the widthwise direction (297 mm).

A reference white board 211 is used to correct data read by CCDs 210-1 to 210-3 included in the 3-line sensor 210. The reference white board 211 has a white color that exhibits an almost uniform reflection characteristic under visible light.

The image processing unit 102 electrically processes the image signals input from the 3-line sensor 210 so as to generate CMYK (cyan, magenta, yellow, and black) color component signals. The image processing unit 102 sends the generated CMYK color component signals to the image output unit 105. The images output at this time are CMYK images that have undergone halftone processing such as dithering.

The image output unit 105 sends, to a laser driver 212, the CMYK image signals sent from the image reading unit 101. The laser driver 212 modulates and drives a semiconductor laser device 213 in accordance with the input image signals. A laser beam output from the semiconductor laser device 213 scans a photosensitive drum 217 via a polygon mirror 214, an f-θ lens 215, and a mirror 216, thereby forming an electric latent image on the photosensitive drum 217.

A developer includes a magenta developer 219, a cyan developer 220, a yellow developer 221, and a black developer 222. The four developers alternately come into contact with the photosensitive drum 217 so as to develop the electric latent images formed on the photosensitive drum 217 by toners of corresponding colors, thereby forming toner images. A printing paper sheet supplied from a printing paper cassette 225 is wound on a transfer drum 223 so that the toner images on the photosensitive drum 217 are transferred to the printing paper sheet.

The printing paper sheet on which the four CMYK color toner images are sequentially transferred passes through a fixing unit 226 serving as a fixing device to thermally fix the toner images. After that, the printing paper sheet is discharged out of the image forming apparatus. The fixing unit 226 applies pressure and heat from an internal pressure roller to the printing paper sheet with the transferred toner images, thereby fixing the four CMYK color toner images on the printing paper sheet. If the heat amount at this time is insufficient relative to the toner amount, a fixing failure occurs so no normal image can be obtained. To prevent this, a temperature sensor (not shown) is attached to the fixing unit 226 to control the apparatus to perform the fixing operation only when a predetermined temperature sufficient for fixing has been confirmed. This temperature control is done by the CPU 104 based on the relationship between the temperature sensor information and the toner amount.

[Relationship Between Toner Amount and Fixing Temperature]

Figure 3:
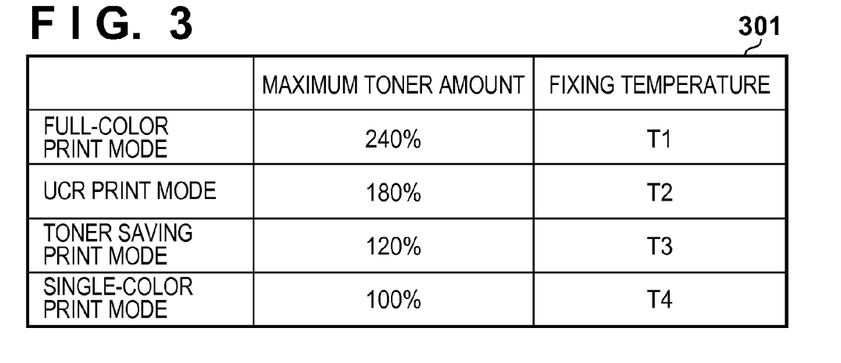
FIG. 3 is a table showing the correspondence relationship between a mode, a toner amount, and a temperature according to the first embodiment.

The relationship between a print mode and the required temperature of the fixing unit concerning the above-described toner amount will be described next with reference to FIG. 3.

The toner amount indicates a toner amount per unit area of an image and will be explained using a unit [%]. More specifically, the maximum value of each of the CMYK colors is defined as 100%. When, for example, two colors are superimposed at their the maximum value, the toner amount in that area is defined as 200%. Each color can take a value from 0% to 100% because of the tonality. The maximum value of the toner amount changes depending on the print mode. Four print modes will be exemplified, and their characteristic features and maximum toner amounts will be described. Note that the types of modes are not limited to those described here. The number of modes to be defined can be increased/decreased in accordance with the function and the like of the image forming apparatus.

In a full-color print mode, the four CMYK color toners are fully used to reproduce an arbitrary color within the range reproducible by the toners, thereby performing high-quality color printing. In this embodiment, a necessary and sufficient maximum toner amount in the full-color print mode is assumed to be approximately 240%.

In a UCR (Under Color Removal) print mode, black or gray made by three CMY colors in the above-described full-color print mode is replaced with a single K color to suppress fly-off of toners in a character or a thin line, thereby improving the character readability. In the UCR print mode, CMY toner are replaced with K toner to decrease the maximum toner amount. In this embodiment, the maximum toner amount in the UCR print mode is assumed to be 180%.

In a toner saving print mode, an image is printed in lighter colors as compared to the above-described full-color print mode, thereby decreasing the amounts of toners to be used. In this embodiment, since the toner use amounts in the toner saving print mode are ½ those in full-color printing, the maximum value is also ½, that is, 120%.

A single-color print mode is represented by monochrome printing in which only one color toner is used. In this embodiment, the maximum value in the single-color print mode is assumed be to 100% that equals the maximum value of the toner amount of one color.

As described above, the maximum toner amount changes between the four modes. Hence, the temperature required of the fixing unit at each time changes, and the required temperature rises as the maximum toner amount increases. Let T1 be the fixing temperature in the full-color print mode, T2 be the fixing temperature in the UCR print mode, T3 be the fixing temperature in the toner saving print mode, and T4 be the fixing temperature in the single-color print mode. In this case, T1>T2>T3>T4 holds. FIG. 3 shows a correspondence table 301 that defines the correspondence relationship between the maximum toner amount and the fixing temperature in each mode. The correspondence table 301 is used for control, and is stored in the RAM area of the storage unit 103 in this embodiment.

[Processing Procedure]

Figure 4:
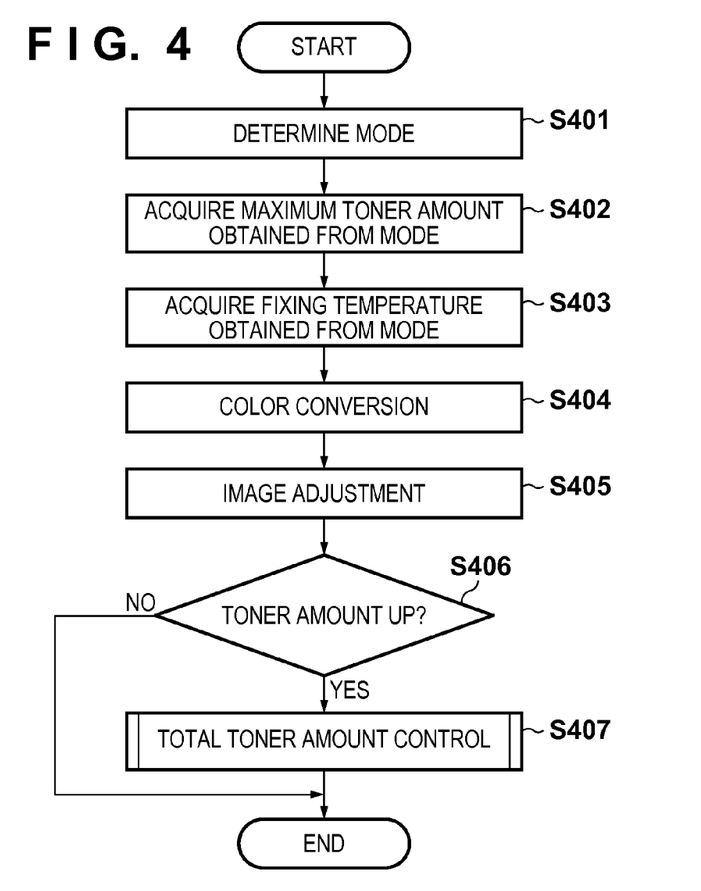
FIG. 4 is a flowchart showing the procedure of processing according to the first embodiment.

FIG. 4 illustrates the procedure of processing according to this embodiment. The processing represented by the procedure to be described below is executed by the CPU 104 and the image processing unit 102 based on an instruction from the CPU 104.

Image data is input from the image reading unit 101 or an external apparatus, and printing starts. In step S401, the CPU 104 determines the set print mode. The CPU 104 determines one of the above-described four modes in accordance with a setting from the UI unit 106 in copy processing or a setting from a driver in print processing.

In step S402, the CPU 104 determines the maximum toner amount in the mode based on the mode determined in step S401. In this case, the CPU 104 looks up the above-described correspondence table 301 shown in FIG. 3 stored in the storage unit 103, and determines the upper-limit value representing the possible maximum toner output amount in that mode. The upper-limit value is thus acquired.

In step S403, the CPU 104 determines a temperature setting necessary for fixing in the mode based on the mode determined in step S401. In this case, the CPU 104 determines the temperature using the correspondence table 301 stored in the storage unit 103, as in step S402. The fixing temperature is thus acquired. The CPU 104 controls the fixing unit 226 to generate the temperature determined in this processing.

In step S404, the image processing unit 102 performs color conversion processing. In this processing, an image expressed by RGB is converted into CMYK data by table conversion using a known 3D LUT. In this case, the image processing unit 102 switches the color conversion table in accordance with the mode determined in step S401. More specifically, the processing is done in the following way.

In the full-color print mode, the RGB values of each pixel are converted into corresponding CMYK values.

In the single-color print mode, the RGB values of each pixel are converted into data of only K.

In the UCR print mode, the RGB values of a gray pixel with R=G=B are converted into only a K value with C=M=Y=0. Otherwise, the RGB values are converted into corresponding CMYK values.

In the toner saving print mode, all the CMYK values converted in the full-color print mode are halved and output.

At this step, the image data represents the CMYK toner amounts whose values are represented by 8-bit data having a value of 0 to 255 for each pixel. The lookup table (to be referred to as an LUT hereinafter) is adjusted not to output a value combination more than the maximum toner amount defined for each mode. More specifically, if the value of each color is 0, this indicates that toners are unused (white). As the value becomes large, the density increases. A value "255" represents the maximum density. The above-described toner amount indicates 100% by 255. The value of C+M+Y+K represents the toner amount of the pixel. The maximum value can be 1020 corresponding to 400%. The LUT is adjusted not to output a value more than the maximum value in each mode. That is, for example, if the maximum value in the full-color print mode is 240%, the LUT is adjusted not to make the toner amount of C+M+Y+K larger than 612.

Figure 9:
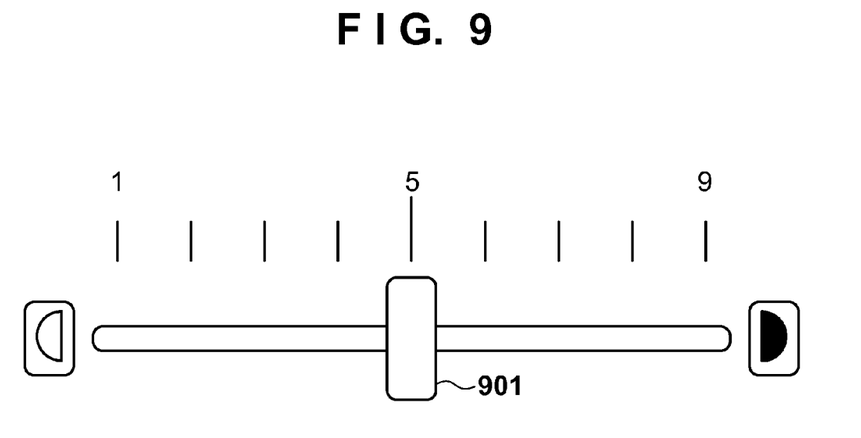
FIG. 9 is a view showing an example of the arrangement of an image adjustment operation unit.

In step S405, the image processing unit 102 performs image adjustment processing. The adjustment is done based on an adjustment value from the UI unit 106 in copy processing or an adjustment value from the printer driver of the external apparatus in print processing. The image adjustment processing will be described here in detail using image density adjustment as an example. FIG. 9 shows a display example on the UI unit 106. The density adjustment value ranges from 1 to 9. The default is 5. When the value is made larger than 5, the image density increases. When the value is made smaller than 5, the image density decreases. Referring to FIG. 9, when a cursor 901 is slid rightward, the density gradually increases, and the adjustment value becomes larger. Conversely, when the cursor 901 is slid leftward, the density decreases, and the value becomes smaller. That is, an increase/decrease in the toner amount is instructed based on the change in the density. Letting Cin be the input value, and Cout be the output value, the equation of each of the CMYK values is given by $$Cout = Cin \times gain + ofst \qquad (1)$$

To increase the density, the gain is set to be larger than 1, and ofst is set to be larger than 0. On the other hand, to decrease the density, the gain is set to be smaller than 1, and ofst is set to be smaller than 0. Without adjustment, gain=1, and ofst=0. Density adjustment is implemented by switching the gain and the ofst in accordance with the density adjustment value from "0" to "9". Note that since the input and output values are represented by 8-bit data that takes a value from 0 to 255, as described above, an output value smaller than 0 is clipped to 0, and a value larger than 255 is clipped to 255.

In optimization of the image adjustment processing, the user decides the value while observing the output image. Hence, the optimum value is normally found by performing adjustment and output feedback several times. That is, the user adjusts the density set value while updating it to a larger value upon finding the image density low or to a smaller value upon finding the image density high.

In step S406, the CPU 104 checks the image toner amount after adjustment. If the density adjustment value in step S405 is 1 to 5, the density cannot be higher (NO in step S406). Since the toner amount cannot be larger than the assumed amount, the processing directly ends. On the other hand, if the density adjustment value is 6 to 9, the toner amount may exceed the assumed maximum toner amount depending on the combination of CMYK (YES in step S406). Hence, total toner amount control is performed in step S407.

In step S407, the image processing unit 102 performs total toner amount control processing when the maximum value of the toner amount exceeds the assumed value. The detailed procedure of this processing will be described with reference to FIG. 5.

Figure 5:
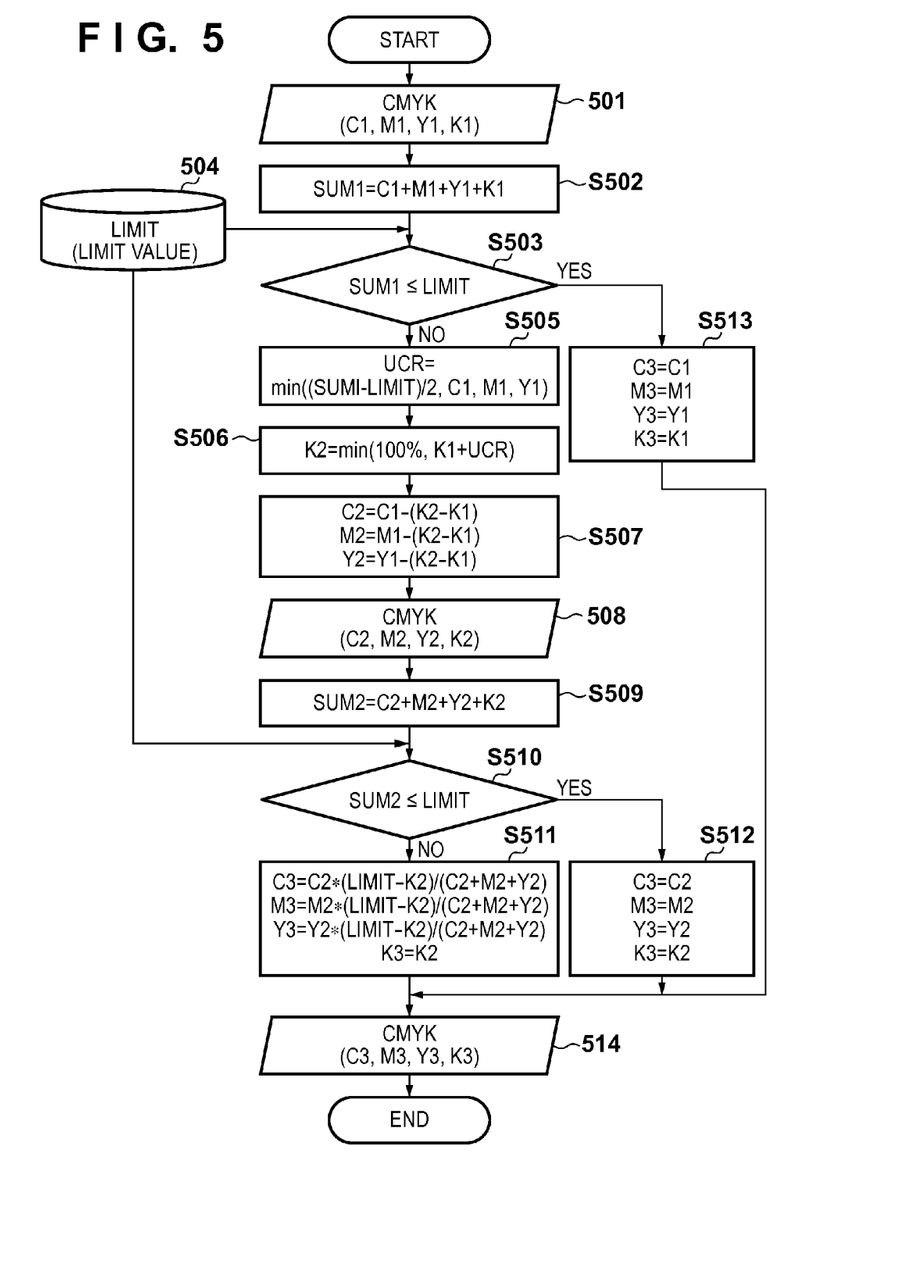
FIG. 5 is a flowchart of total toner amount control processing.

The processing procedure shown in FIG. 5 is executed while referring to all the CMYK colors of the image that have undergone density adjustment on the pixel basis. Note that in FIG. 5, a reference numeral with "S" denotes a block representing processing, and a reference numeral without "S" denotes a block representing data or the like.

In step S502, the image processing unit 102 calculates a sum SUM1 of an input CMYK (C1, M1, Y1, K1) 501. The CMYK (C1, M1, Y1, K1) 501 represents data of each pixel of the CMYK image after the image adjustment processing of step S405. In step S503, the image processing unit 102 loads a LIMIT (limit value) 504 and compares it with SUM1. The LIMIT (limit value) 504 is the limit value of a fixable toner amount, which corresponds to the maximum toner amount obtained in step S402. In the above-described full-color print mode, it is defined by a numerical value such as "240%".

If SUM1 is equal to or smaller than the LIMIT (limit value) 504 (YES in step S503), the image processing unit 102 outputs the CMYK (C1, M1, Y1, K1) 501 as a CMYK (C3, M3, Y3, K3) 514 in step S513. The CMYK (C3, M3, Y3, K3) 514 represents data of each pixel of the CMYK image that is the output of the total toner amount control processing.

If SUM1 is larger than the LIMIT (limit value) 504 (NO in step S503), the image processing unit 102 calculates a UCR value in step S505. The UCR value affects the decrease values of the CMY toners and the increase value of K and is calculated, in this embodiment, by $$UCR = \min((SUM1 - Limit)/2, C1, M1, Y1) \qquad (2)$$

Equation (2) indicates that the half of the amount beyond the limit value or the smallest one of C1, M1, and Y1 is set as the UCR value to minimize the toner amount decrease amount.

In step S506, the image processing unit 102 calculates K2 out of C2, M2, Y2, K2 that are the values after the first total toner amount restriction. A value obtained by adding the UCR value to K1 is fundamentally used. However, a value more than 100% cannot be set for the single value K2. If the value exceeds 100%, a value "100%" is set for K2.

In step S507, the image processing unit 102 decreases the values C1, M1, and Y1 to calculate the values C2, M2, and Y2. In this case, the difference between the value K2 and the value K2 calculated in step S506 is used as the decrease value. With the above-described processing procedure, a CMYK (C2, M2, Y2, K2) 508 after the total toner amount has been decreased is calculated.

In step S509, the image processing unit 102 calculates SUM2 that is the sum of C2, M2, Y2, and K2. In step S510, the image processing unit 102 loads the LIMIT (limit value) 504 and compares it with SUM2. If SUM2 is equal to or smaller than the LIMIT (limit value) 504 (YES in step S510), the image processing unit 102 outputs the CMYK (C2, M2, Y2, K2) 508 as the CMYK (C3, M3, Y3, K3) 514 in step S512. If SUM2 is larger than the LIMIT (limit value) 504 (NO in step S510), the image processing unit 102 directly sets the value K2 as K3 in step S511. In addition, the image processing unit 102 calculates a coefficient from the value obtained by subtracting K2 from the LIMIT (limit value) 504 and the sum of C2, M2, and Y2. The image processing unit 102 multiplies C2, M2, and Y2 by the calculated coefficient to calculate C3, M3, and Y3 after the toner amounts have been decreased. And, the image processing unit 102 outputs the CMYK (C3, M3, Y3, K3) 514.

With this processing, the sum of CMYK, that is, the total toner amount is guaranteed to be equal to or smaller than the maximum toner amount corresponding to the print mode. It is therefore possible to guarantee fixing at the fixing temperature determined in step S403.

Performing maximum toner amount control corresponding to the mode in accordance with the above-described procedure makes it possible to output an image under a predetermined fixing temperature setting independently of the image adjustment value. That is, the fixing device is controlled to a predetermined fixing temperature in the steps before and after step S405 independently of the result of image adjustment of step S405. For this reason, the fixing unit never changes its temperature during the adjustment value search while getting feedback from the output. It is therefore possible to acquire an optimum adjustment value without changing the tonality and gloss characteristic of the image during adjustment.

In this embodiment, density adjustment has been exemplified as the image adjustment means. However, the same arrangement as described above can be implemented for any other image adjustment such as color-specific density adjustment, hue adjustment, and saturation adjustment.

Second Embodiment

In the first embodiment, temperature control of the fixing unit is performed based on the print mode and the maximum toner amount at that time. However, the maximum toner amount of a print mode may rarely be used depending on the image. For example, when monochrome data is printed in the full-color print mode, the toner amount does not exceed 100% because most of the data uses the single K color. In this case, if the fixing unit uses the temperature setting for the full-color print mode, the waiting time for warm-up or power consumption is wasted.

In the second embodiment, a method will be described in which an optimum temperature setting for the fixing unit is analyzed for each image, and the temperature setting is accordingly performed not to cause a temperature change during image adjustment.

Note that details of the arrangement of the image forming apparatus and the outline of the apparatus, the description of block diagrams, and the description of image adjustment processing and total toner amount control processing, which are the same as in the first embodiment, will be omitted. A description will be provided using a procedure including image analysis as a point of the embodiment.

[Relationship Between Toner Amount and Fixing Temperature]

The relationship between a toner amount, a print mode, and the required temperature of the fixing unit will be described first. As described in the first embodiment, the toner amount indicates a toner amount per unit area of an image. The temperature required of the fixing unit to properly fix an image needs to be set so as to fix the maximum value of the toner amount in the image. In the first embodiment, since the maximum toner amount changes between the print modes, the temperature required of the fixing unit at each time changes. Hence, an example has been described in which the required temperature rises as the maximum toner amount increases.

However, when the maximum toner amount is 0, that is, a white sheet is to the output, the temperature for fixing is unnecessary. Even in the full-color print mode, if there is no pixel using a toner amount more than 180%, the temperature need not be higher than T2. The relationship between the maximum toner amount and the fixing temperature is not originally represented by discrete data as shown in FIG. 3 but changes continuously as shown in FIG. 6.

Figure 6:
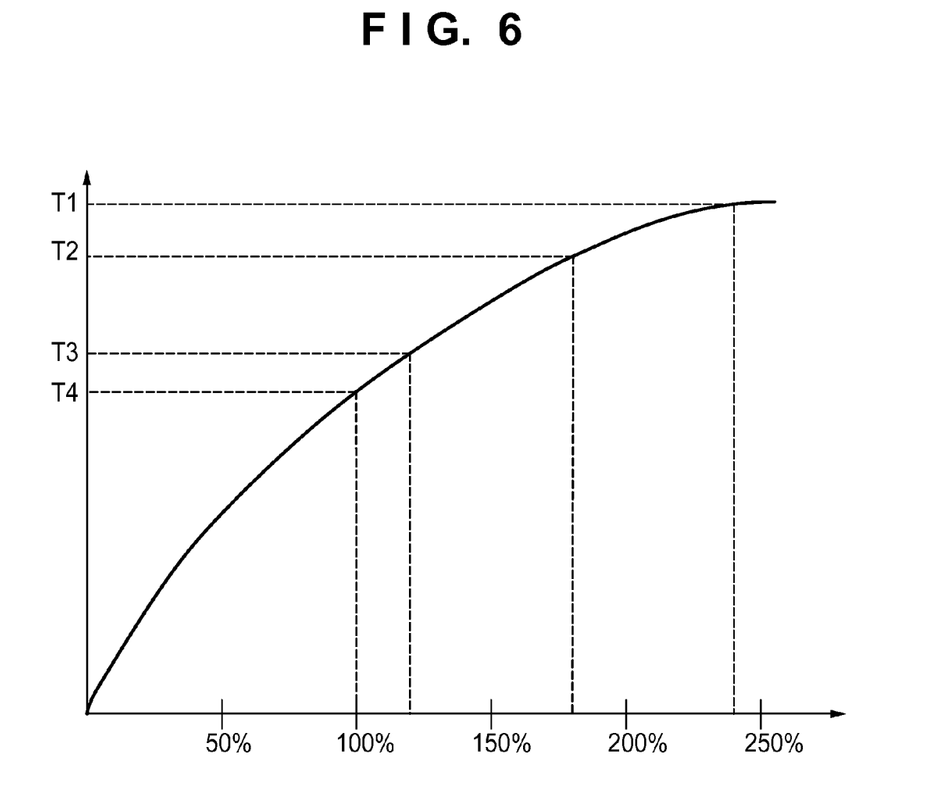
FIG. 6 is a graph showing the relationship between a toner amount and a temperature according to the second embodiment.

Hence, the minimum temperature necessary for fixing can be obtained by calculating the optimum fixing temperature based on image data from the relationship as shown in FIG. 6. The problematic fixing failure or the like does not occur in the entire image if the temperature rises to a temperature capable of fixing a pixel having the maximum toner amount out of the pixels included in the image. The relationship represented by the graph as shown in FIG. 6 is used for control, and is stored in the RAM area of a storage unit 103 in the form of, for example, an LUT.

[Processing Procedure]

Figure 7:
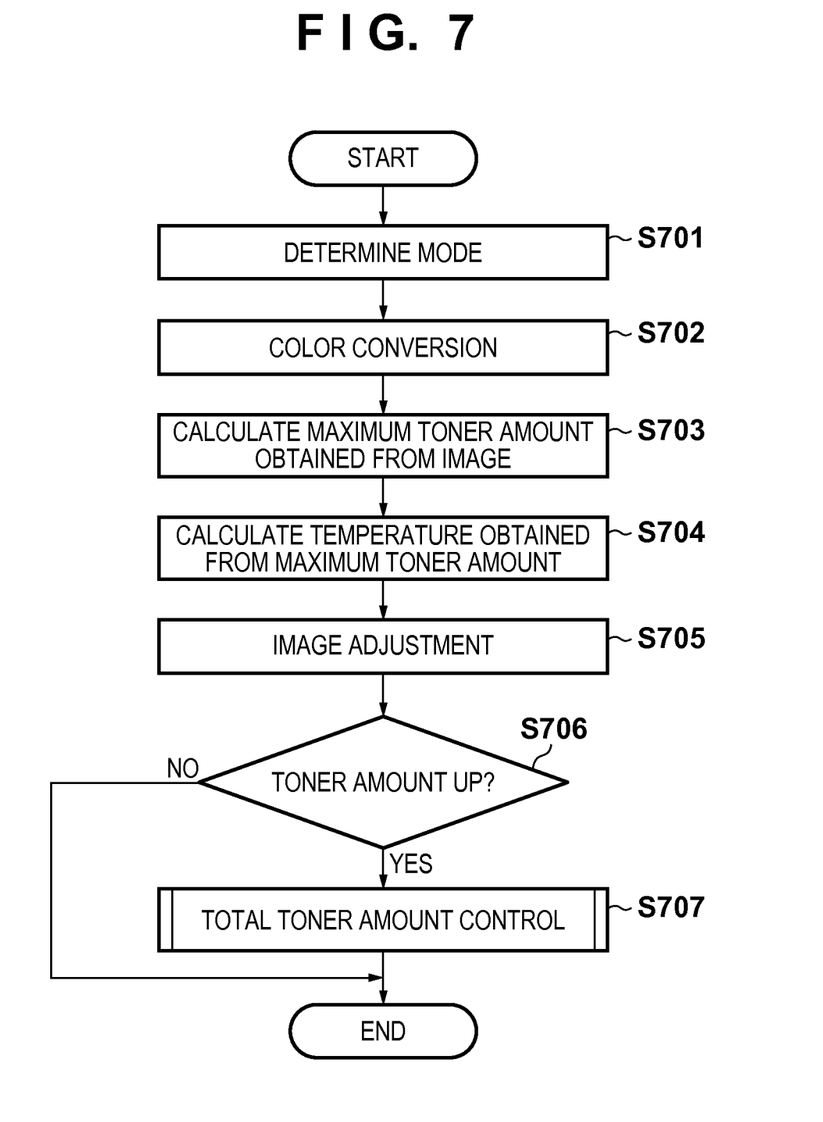
FIG. 7 is a flowchart showing the procedure of processing according to the second embodiment.

FIG. 7 illustrates the procedure of processing according to this embodiment. The processing represented by the procedure to be described below is executed by an image processing unit 102 based on an instruction from a CPU 104. Note that a description of the same parts as in FIG. 4 described in the first embodiment will be omitted.

Image data is input from an image reading unit 101 or an external apparatus, and printing starts. In step S701, the CPU 104 determines the set print mode. The CPU 104 determines one of the four modes described in the first embodiment in accordance with a setting from a UI unit 106 in copy processing or a setting from a driver in print processing.

In step S702, the image processing unit 102 performs color conversion processing. In this processing, an image expressed by RGB is converted into CMYK data by table conversion using a known 3D LUT. The image processing unit 102 switches the color conversion table in accordance with the mode determined in step S701. Details are the same as in step S404, and a description thereof will be omitted.

In step S703, the image processing unit 102 calculates the maximum toner amount of the pixels of the image. This is processing of searching for the maximum value SUM-MAX of a sum SUM (=C+M+Y+K) of the CMYK values of all pixels included in the image. The value changes depending on the type of the image but never exceeds the maximum value of each mode described with reference to FIG. 3 of the first embodiment.

In step S704, the CPU 104 obtains the fixing temperature corresponding to the value SUM-MAX obtained in step S703. The CPU 104 obtains the fixing temperature necessary for fixing SUM-MAX by referring to the value in the graph shown in FIG. 6 stored in the storage unit 103. The fixing temperature is thus calculated. The temperature never exceeds the fixing temperature of the mode described with reference to FIG. 3 of the first embodiment and is always lower than the temperature obtained in step S403 of the first embodiment. A fixing unit 226 is controlled to the temperature determined in this processing.

Image adjustment of step S705 and determining whether the toner amount exceeds the maximum value in step S706 are the same as the processes of steps S405 and S406 described in the first embodiment, and a description thereof will be omitted.

In step S707, the image processing unit 102 performs total toner amount control processing. Details of the processing are the same as in step S407 (FIG. 5). Note that the maximum toner amount SUM-MAX obtained in step S703 is converted into a percentage and used as the LIMIT (limit value) here.

The above-described processing makes it possible to output an image under a predetermined fixing temperature setting independently of the image adjustment value. That is, the fixing device is controlled to a predetermined fixing temperature in the steps before and after step S705 independently of the result of image adjustment of step S705. It is therefore possible to acquire an optimum adjustment value without changing the tonality and gloss characteristic of the image during adjustment, as in the first embodiment.

In addition, the image is appropriately analyzed, and the maximum toner amount is calculated based on the image. This enables an operation at a lower fixing temperature within the toner fixable range.

Third Embodiment

In the first and second embodiments, temperature control of the fixing unit is performed based on the relationship of the maximum toner amount so as to fix an image always at the temperature independently of image adjustment, thereby guaranteeing that the temperature does not change during the adjustment. However, even after the toner amount has been decreased by the adjustment to an amount fixable even at a lower temperature, the fixation is performed using the temperature decided before the adjustment. This leads to wasteful power and warm-up time. The user may allow a change in the image caused by a temperature change during image adjustment. In this case, the power and time are only wasted.

In the third embodiment, a method will be described in which the temperature of the fixing unit is controlled by switching between a mode to minimize the waste of power and time and a mode to guarantee that no change occurs during image adjustment while allowing a change in an image during image adjustment based on a user setting. Note that in this embodiment, the mode to minimize the waste of power and time will be referred to as a "low-temperature fixing mode", and the apparatus can accept this setting from the user. A setting acquisition means is implemented by accepting the mode setting from the user.

Note that details of the arrangement of the image forming apparatus and the outline of the apparatus, the description of block diagrams, and the description of image adjustment processing, total toner amount control processing, and image analysis processing, which are the same as in the first embodiment, will be omitted. A description will be provided using a procedure including switching as a point of the embodiment.

Figure 8:
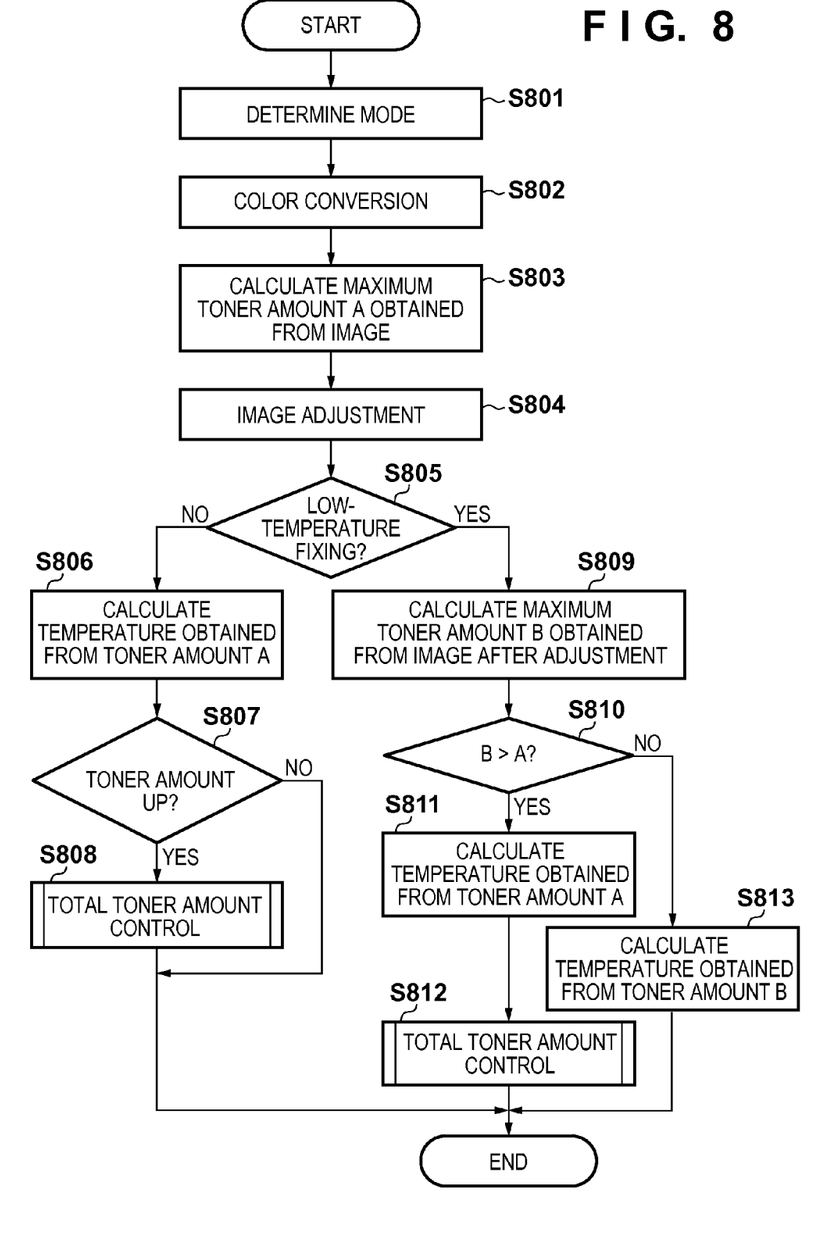
FIG. 8 is a flowchart showing the procedure of processing according to the third embodiment.

FIG. 8 illustrates the procedure of processing according to this embodiment. The processing represented by the procedure to be described below is executed by an image processing unit 102 based on an instruction from a CPU 104. Note that a description of the same parts as in FIG. 4 described in the first embodiment and FIG. 7 described in the second embodiment will be omitted.

Image data is input from an image reading unit 101 or an external apparatus, and printing starts. In step S801, the CPU 104 determines the set print mode. The CPU 104 determines one of the four modes described in the first embodiment in accordance with a setting from a UI unit 106 in copy processing or a setting from a driver in print processing.

In step S802, the image processing unit 102 performs color conversion processing. In this processing, an image expressed by RGB is converted into CMYK data by table conversion using a known 3D LUT. The image processing unit 102 switches the color conversion table in accordance with the mode determined in step S801. Details are the same as in step S404, and a description thereof will be omitted.

In step S803, the image processing unit 102 calculates the maximum toner amount of the pixels of the image. This is processing of searching for the maximum value of the sum of the CMYK values of all pixels included in the image. This value is held as a maximum toner amount A. Details of the processing are the same as in step S703, and a description thereof will be omitted.

In step S804, the image processing unit 102 performs image adjustment processing. Details are the same as in step S405, and a description thereof will be omitted.

In step S805, the CPU 104 determines whether the low-temperature fixing mode has been set by the user. When the user wants to minimize power consumption while allowing a change in the image during image adjustment, he/she sets the low-temperature fixing mode. When this setting is done (YES in step S805), control is performed to make the temperature of a fixing unit 226 have the minimum value to fix the image. If the low-temperature fixing mode is not set (NO in step S805), control is performed such that the temperature of the fixing unit does not change during image adjustment, as described in the first or second embodiment.

Upon determining that the low-temperature fixing mode has been set (YES in step S805), the image processing unit 102 calculates the maximum toner amount in the image after image adjustment in step S809. The processing itself is the same as in step S803 only except that an image that has undergone image adjustment is used. The image processing unit 102 holds the maximum toner amount calculated by this processing as a maximum toner amount B. This processing will also be referred to as second toner amount acquisition, as compared to toner amount acquisition in step S803.

In step S810, the CPU 104 compares the maximum toner amount A calculated in step S803 with the maximum toner amount B calculated in step S805. If the image adjustment of step S804 has been done to, for example, raise the density and increase the toner amount, the maximum toner amount B is larger. On the other hand, if the adjustment has been done to lower the density and decrease the toner amount, the maximum toner amount A is larger.

When the maximum toner amount B is smaller (NO in step S810), the CPU 104 obtains the fixing temperature in step S813. In this case, the maximum toner amount of the output image after the image adjustment has been done to decrease the toner amount is B. The CPU 104 obtains the fixing temperature from the maximum toner amount B. In this case, the CPU 104 obtains the fixing temperature necessary for fixing the maximum toner amount B by referring to the graph shown in FIG. 6 stored in a storage unit 103. The CPU 104 controls the fixing unit 226 to the temperature determined in this processing.

When the maximum toner amount A is smaller (YES in step S810), the CPU 104 obtains the fixing temperature in step S811. In this case, since the image adjustment has been done to increase the toner amount, the CPU 104 obtains the fixing temperature from the maximum toner amount A before the adjustment. The fixing temperature is obtained by referring to the graph shown in FIG. 6, as in step S813.

In step S812, the image processing unit 102 performs total toner amount control processing. Since the toner amount has been increased by the image adjustment, the image cannot be fixed at the fixing temperature obtained in step S811. Hence, the image processing unit 102 performs the total toner amount control processing by setting the maximum toner amount A to the LIMIT (limit value) such that the image can be fixed at the fixing temperature. Details of the processing are the same as in step S407.

The above-described processing makes it possible to switch between the mode to minimize the waste of power and time and the mode to guarantee that no change occurs during image adjustment while allowing a change during image adjustment based on a user setting.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-218325, filed Sep. 30, 2011, which is hereby incorporated by reference herein in its entirety.

The invention claimed is:

1. An image processing apparatus comprising:
a mode determination unit configured to determine a print mode;
a fixing temperature acquisition unit configured to acquire fixing temperature information corresponding to the print mode determined by said mode determination unit;
an image adjustment unit configured, after the fixing temperature information is acquired by said fixing temperature acquisition unit, to accept an instruction to perform image adjustment corresponding to an adjustment value for image data and to perform image adjustment corresponding to the adjustment value for the image data;
an upper-limit value acquisition unit configured to acquire an upper-limit value of a toner amount corresponding to the print mode determined by said mode determination unit;
a restriction unit configured to restrict the toner amount to the upper-limit value in case where the toner amount of the image data has exceeded the upper-limit value due to the image adjustment by said image adjustment unit; and
a control unit configured to control a fixing temperature of a fixing device in accordance with the fixing temperature information acquired by said fixing temperature acquisition unit before and after the image adjustment is performed by said image adjustment unit.

2. The apparatus according to claim 1, wherein an upper-limit value of a toner amount per unit area of an image and a fixing temperature corresponding to the upper-limit value of the toner amount are defined in accordance with the print mode.

3. The apparatus according to claim 1, wherein the image adjustment is one of image density adjustment, color-specific density adjustment, hue adjustment, and saturation adjustment.

4. An image processing apparatus comprising:
a toner amount acquisition unit configured to acquire a maximum value of a toner amount of a pixel included in image data;
a fixing temperature calculation unit configured to calculate a value of a fixing temperature corresponding to the maximum value of the toner amount acquired by said toner amount acquisition unit;
an image adjustment unit configured, after the value of the fixing temperature is calculated by said fixing temperature calculation unit, to accept an instruction to perform image adjustment corresponding to an adjustment value for the image data and to perform image adjustment corresponding to the adjustment value for the image data; and
a control unit configured to control a fixing temperature of a fixing device in accordance with the value of the fixing temperature calculated by said fixing temperature calculation unit before and after the image adjustment is performed by said image adjustment unit.

5. The apparatus according to claim 4, further comprising a restriction unit configured to restrict a toner amount of the image data to the maximum value in a case where the toner amount of the image data has exceeded the maximum value of the toner amount due to the image adjustment by said image adjustment unit.

6. The apparatus according to claim 4, further comprising:
a setting acquisition unit configured to accept a mode setting for performing a fixing operation at a lower fixing temperature;
a second toner amount acquisition unit configured, in a case where the mode setting for performing the fixing operation at the lower fixing temperature has been done by said setting acquisition unit, to acquire a maximum value of a toner amount of a pixel included in image data for which the toner amount of the image data has been changed by the image adjustment by said image adjustment unit; and
a comparison unit configured to compare the maximum value of the toner amount acquired by said toner amount acquisition unit with the maximum value of the toner amount acquired by said second toner amount acquisition unit, wherein if it is determined as a result of the comparison by said comparison unit that the maximum value of the toner amount acquired by said second toner amount acquisition unit is smaller, said fixing temperature calculation unit calculates the value of the fixing temperature using the maximum value of the toner amount acquired by said second toner amount acquisition unit.

7. An image processing method comprising the steps of:
determining a print mode;
acquiring fixing temperature information corresponding to the print mode determined in the determining step;
accepting, after the fixing temperature information is acquired in the acquiring step, an instruction to perform image adjustment corresponding to an adjustment value for image data and performing image adjustment corresponding to the adjustment value for the image data;
acquiring an upper-limit value of a toner amount corresponding to the print mode determined by said mode determination step;
restricting the toner amount to the upper-limit value in a case where the toner amount of the image data has exceeded the upper-limit value due to the image adjustment; and
controlling a fixing temperature of a fixing device in accordance with the fixing temperature information acquired in the acquiring step before and after the image adjustment is performed.

8. An image processing method comprising the steps of:
acquiring a maximum value of a toner amount of a pixel included in image data;
calculating a value of a fixing temperature corresponding to the maximum value of the toner amount acquired in the acquiring step;
accepting, after the value of the fixing temperature is calculated in the fixing temperature calculation step, an instruction to perform image adjustment corresponding to an adjustment value for the image data and performing image adjustment corresponding to the adjustment value for the image data; and
controlling a fixing temperature of a fixing device in accordance with the value of the fixing temperature calculated in the calculating step before and after the image adjustment is performed.

9. A non-transitory computer-readable medium storing a program that causes a computer to function as:
a mode determination unit configured to determine a print mode;
a fixing temperature acquisition unit configured to acquire fixing temperature information corresponding to the print mode determined by said mode determination unit;
an image adjustment unit configured, after the fixing temperature information is acquired by said fixing temperature acquisition unit, to accept an instruction to perform image adjustment corresponding to an adjustment value for image data and to perform image adjustment corresponding to the adjustment value for the image data;
an upper-limit value acquisition unit configured to acquire an upper-limit value of a toner amount corresponding to the print mode determined by said mode determination unit;
a restriction unit configured to restrict the toner amount to the upper-limit value in a case where the toner amount of the image data has exceeded the upper-limit value due to the image adjustment by said image adjustment unit; and
a control unit configured to control a fixing temperature of a fixing device in accordance with the fixing temperature information acquired by said fixing temperature acquisition unit before and after the image adjustment is performed by said image adjustment unit.

10. A non-transitory computer-readable medium storing a program that causes a computer to function as:
a toner amount acquisition unit configured to acquire a maximum value of a toner amount of a pixel included in image data;
a fixing temperature calculation unit configured to calculate a value of a fixing temperature corresponding to the maximum value of the toner amount acquired by said toner amount acquisition unit;
an image adjustment unit configured, after the value of the fixing temperature is calculated by said fixing temperature calculation unit, to accept an instruction to perform image adjustment corresponding to an adjustment value for the image data and to perform image adjustment corresponding to the adjustment value for the image data; and
a control unit configured to control a fixing temperature of a fixing device in accordance with the value of the fixing temperature calculated by said fixing temperature calculation unit before and after the image adjustment is performed by said image adjustment unit.

11. An image processing apparatus comprising:
a mode determination unit configured to determine a print mode; and
a control unit configured to control a fixing temperature of a fixing device in accordance with fixing temperature information corresponding to the print mode determined by said mode determination unit regardless of an adjustment value of image adjustment processing for image data.

12. An image processing method comprising the steps of:
determining a print mode; and
controlling a fixing temperature of a fixing device in accordance with fixing temperature information corresponding to the print mode determined in the determining step regardless of an adjustment value of image adjustment processing for image data.

* * * * *